United States Patent [19]
Clarke et al.

[11] Patent Number: 5,422,002
[45] Date of Patent: Jun. 6, 1995

[54] TREATMENT OF WATER TO REMOVE GAS VACUOLATE CYANOBACTERIA

[75] Inventors: Keith B. Clarke, Great Yarmouth, England; Anthony E. Walsby, 27 Old Sneed Park, Stoke Bishop, Bristol, England, B29 1RG

[73] Assignees: East Anglian Water Company, Lowestoft; Anthony E. Walsby, Bristol, both of England

[21] Appl. No.: 735,615

[22] Filed: Jul. 25, 1991

Related U.S. Application Data

[63] Continuation of Ser. No. 435,706, Nov. 13, 1989, abandoned, which is a continuation of Ser. No. 101,658, Sep. 28, 1987, abandoned.

[30] Foreign Application Priority Data

Sep. 30, 1986 [GB] United Kingdom ............... 8623428

[51] Int. Cl.⁶ ............................................... C02F 1/00
[52] U.S. Cl. ........................................ 210/170; 210/258
[58] Field of Search ................. 210/747, 170, 257.1, 210/258, 513, 532.1

[56] References Cited

U.S. PATENT DOCUMENTS

| | | | |
|---|---|---|---|
| 4,526,692 | 7/1985 | Yohe et al. | 210/747 |
| 4,582,610 | 4/1986 | Baker | 210/747 |
| 4,683,063 | 7/1987 | Rice | 210/747 |
| 4,696,802 | 9/1987 | Bedell | 210/747 |
| 4,744,908 | 5/1988 | Peterscheck et al. | 210/747 |

*Primary Examiner*—Thomas Wyse
*Attorney, Agent, or Firm*—Stanger, Dreyfus & Shapiro

[57] ABSTRACT

The treatment of water to remove gas vacuolate cyanobacteria is effected by subjecting the water to a predetermined pressure by being pumped down a centrally located pipe in a bore-hole, which is steel lined. This causes the gas vesicles in the cyanobacteria to collapse. The treated water is then stored in a settling tank where the cyanobacteria sink to the bottom and can be removed along with any other sediment in the water. The method can be applied to decrease the amount of cyanobacteria with gas vesicles in a lake or other water impoundment. (FIG. 1)

11 Claims, 3 Drawing Sheets

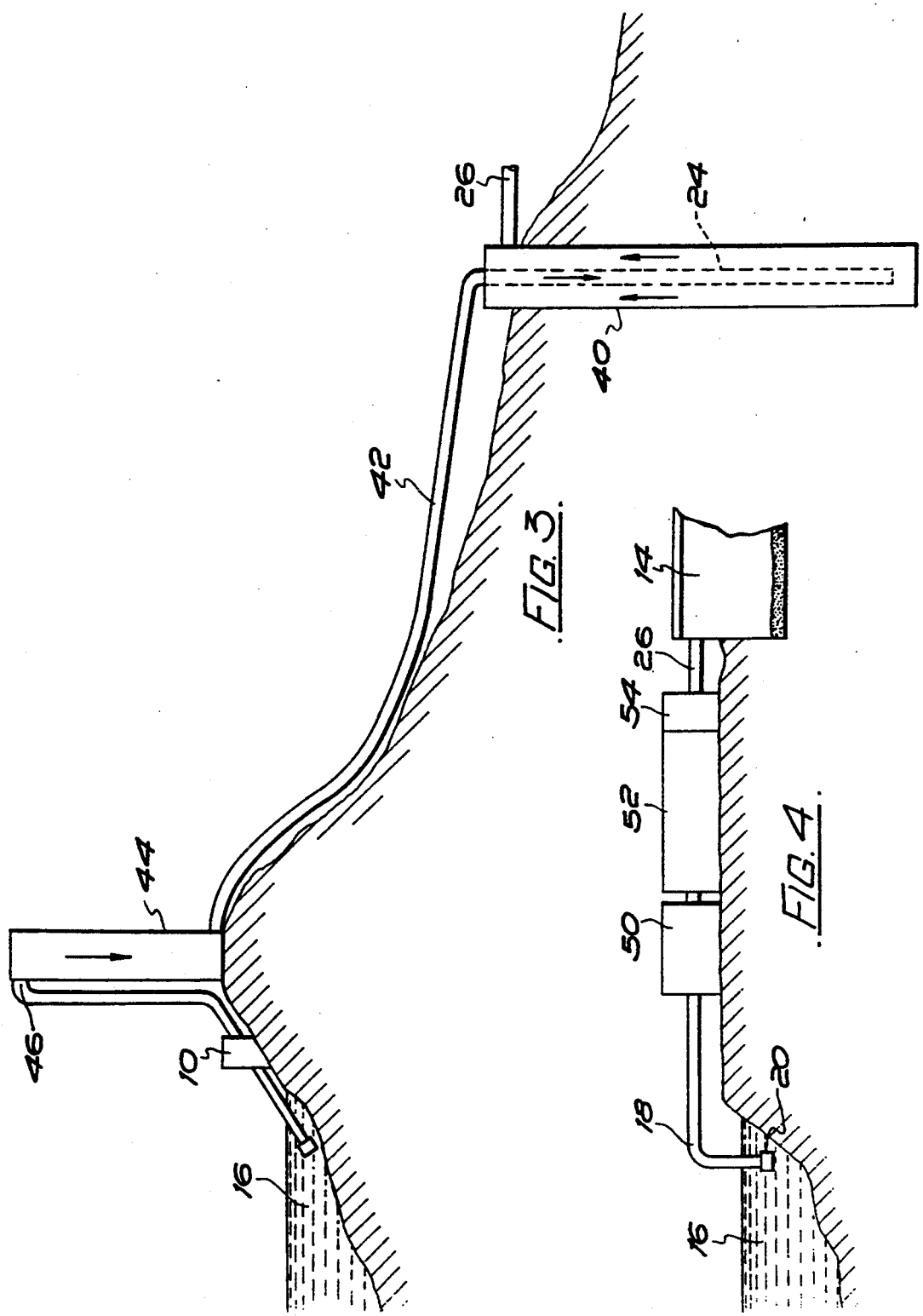

TREATMENT OF WATER TO REMOVE GAS VACUOLATE CYANOBACTERIA

This application is a continuation of application Ser. No. 07/435,706, filed Nov. 13, 1989, now abandoned; which is a continuation of application Ser. No. 07/101,658, filed Sep. 28, 1987, now abandoned.

FIELD OF THE INVENTION

The present invention relates to a method of and apparatus for the treatment of water to remove gas vacuolate cyanobacteria.

In some water treatment processes at present in operation, the water to be treated before being supplied to the customer is first allowed to stand in settlement tanks where the sediment and foreign bodies in the water taken from the reservoir or lake is allowed to settle to form a sludge at the bottom.

However, in certain areas and at certain times of the year gas-vacuolate cyanobacteria otherwise known as blue-green algae can form in a lake or reservoir. These cyanobacteria cannot be removed in settlement tanks because they float upwards and on the surface of the water.

BACKGROUND THEORY

It is well known that these cyanobacteria float because they contain gas vesicles that is they embody microscopic gas filled structures which ensure that they float rather than sink.

The gas vesicles of cyanobacteria are hollow, cylindrical structures with cone shaped ends. When a gas vesicle is subjected to a moderate pressure (up to 1 bar) it shows only a small volume change (shown to be about 1 part in 650 per bar for gas vesicles of cyanobacterium *Anabaena flos-aquae* in a report by A. E. Walsby in the Proceedings of the Royal Society of London, Volume 216, pages 355-368) but at a certain critical pressure the structure collapses flat. A. E. Walsby, in a paper in the Proceedings of the Royal Society of London, Volume 178, pages 301-326, showed that the average critical collapse pressure of gas vesicles in *Anabaena flos-aquae* varies from 4 bar to 8 bar with a mean value of about 6 bar. When the gas vesicle collapses the conical ends flatten to sectors of circles and pull away from the central cylinder, which flattens to a rectangular envelope. The contained gas diffuses out of the structure and dissolves in the surrounding water as the gas vesicle collapses.

When the gas vesicles inside cells of cyanobacteria are collapsed the cyanobacteria lose their means of buoyancy and sink. This is illustrated in FIG. 1 of a paper by A. E. Walsby in Bacteriological Reviews, Volume 36 pages 1-32, an article which contains much other information on gas vesicles and their properties. It has been established from research carried out by P. K. Hayes and A. E. Walsby in a paper in the British Phycological Journal, Volume 21, pages 191-197 that the median critical pressure of gas vesicles from different species of cyanobacteria varied from about 5-9 bar and were inversely correlated with the mean diameters.

PRIOR ART

Various methods of treating cyanobacteria or dispersing them have not been found to be successful and the most practical method of removal would be to cause them to sink, by collapsing their gas vesicles, whereby they could be removed along with the rest of the sediment in the water.

There have been two previous attempts to do this. The first involved an attempt to collapse gas vesicles in cyanobacteria by subjecting them to ultra sound as described in the discussion section of a paper by A. J. Brook in water treatment and examination, Volume 8 pages 133-137.

The second involved attempts to collapse gas vesicles by explosions detonated under water, described by A. E. Walsby in the New Scientist of 21 Nov. 1968 pages 436-437, and by D. Menday in Water Research Volume 6, pages 279-284.

Neither of these methods have proved to be practicable in a method of removing cyanobacteria from water. We describe here a new method of collapsing gas vesicles of cyanobacteria with a hydrostatic head of water, and the subsequent removal of these pressure-treated organisms from water by sedimentation.

Although not directly relevant to the treatment of water to remove gas vacuolate cyanobacteria, a method for the disposal of solid wastes has been disclosed in British Patent Specification No. 1,163,494. The method for disposing of solid biologically activated waste materials disclosed in this Specification, includes the steps of:

(a) providing the waste materials in an aqueous slurry;

(b) pumping the slurry to a well;

(c) transporting the slurry in the well to a porous and permeable underground formation; and (d) pressure injecting the slurry under positive well head pressure directly into the porous and permeable underground formation at a pressure which the formation readily accepts the slurry without fracturing it.

Such a method would be totally unsuitable for the treatment of water to remove gas vacuolate cyanobacteria, in view of the following:

(a) the earlier Specification teaches the disposal of waste solids and not purification of water; and (b) the various steps proposed in the earlier Specification are costly and time consuming and could in no way be technologically adapted to the treatment of water.

Other methods not directly relevant to the treatment of water to remove gas vacuolate cyanobacteria have been disclosed in British Patent specifications 1,521,558; 1,557,731; 1,540,065; and 1,573,907. All of these relate to the treatment of waste water and sewage by injection of gas containing free oxygen under pressure. The method employed in each of these specifications is such that it would prevent the collapse of the gas vesicles in gas vacuolate cyanobacteria as described by A. E. Walsby in the paper in the Proceedings of the Royal Society Volume 178 pages 301-326 and further, as is made clear in the last of these specifications No. 1,573,907, the addition of oxygen under pressure would cause the material to float rather than to sediment out.

SUMMARY OF THE INVENTION

It is an object of the present invention to overcome the above problems by providing a method of and apparatus for the removal of gas vacuolate cyanobacteria from water.

According to one aspect of the present invention there is provided a method of treatment of water to remove gas vacuolate cyanobacteria which includes the steps of: hydrostatically subjecting the water removed from a body of water to a predetermined pressure in order to collapse the gas vesicles inside the cells of the cyanobacteria, and separating the thus treated cyanobacteria by allowing them to sink to the bottom of settlement means along with any other sediment in the water.

Preferably the said predetermined pressure is approximately six bar, but may be as much as ten bar. A pressure exceeding 10 bar may be used but it is normally more than is needed to collapse the gas vesicles inside the cells of cyanobacteria that live in fresh water.

According to another aspect of the present invention there is provided apparatus for treatment of water to remove gas vacuolate cyanobacteria, including: means for hydrostatically subjecting the water removed from a body of water to a predetermined pressure in order to collapse the gas vesicles inside the cells of the cyanobacteria; and settlement means for separating the thus treated cyanobacteria that sink to the bottom of said settlement means along with any other sediment in the water.

The means for applying a hydrostatic pressure to the water may comprise firstly a lined bore-hole sunk in the ground, or secondly a tower case located above the ground, or thirdly a pump delivery pipe having at its remote end a diffuser or pressure relief valve necessary to ensure that the pump produces the required additional hydrostatic pressure in the pipe, or fourthly any combination of the bore-hole, the tower case and the pump delivery pipe with diffuser or relief value. In the case of the bore-hole and tower, the water is peferably applied through a centrally located pipe extending down the lined bore-hole or tower case to the bottom thereof. The minimum depth of the bore-hole or height of the tower case lies in the range of 31 m to 102 m, the preferred depth or height being 60 m.

Preferably the bore-hole is steel lined, but other designs of bore-hole, such as a down pipe linked to an up pipe in the form of a U-tube, may be used instead.

BRIEF DESCRIPTION OF THE DRAWINGS

The present invention will now be described in greater detail by way of example with reference to the accompanying drawings, wherein;

FIG. 3 is a diagrammatic representation of a first alternative form of the apparatus shown in FIG. 1; and FIG. 4 is a diagrammatic representation of a second alternative form of the apparatus shown in FIG. 1.

DESCRIPTION OF THE PREFERRED EMBODIMENTS

Figure 1:
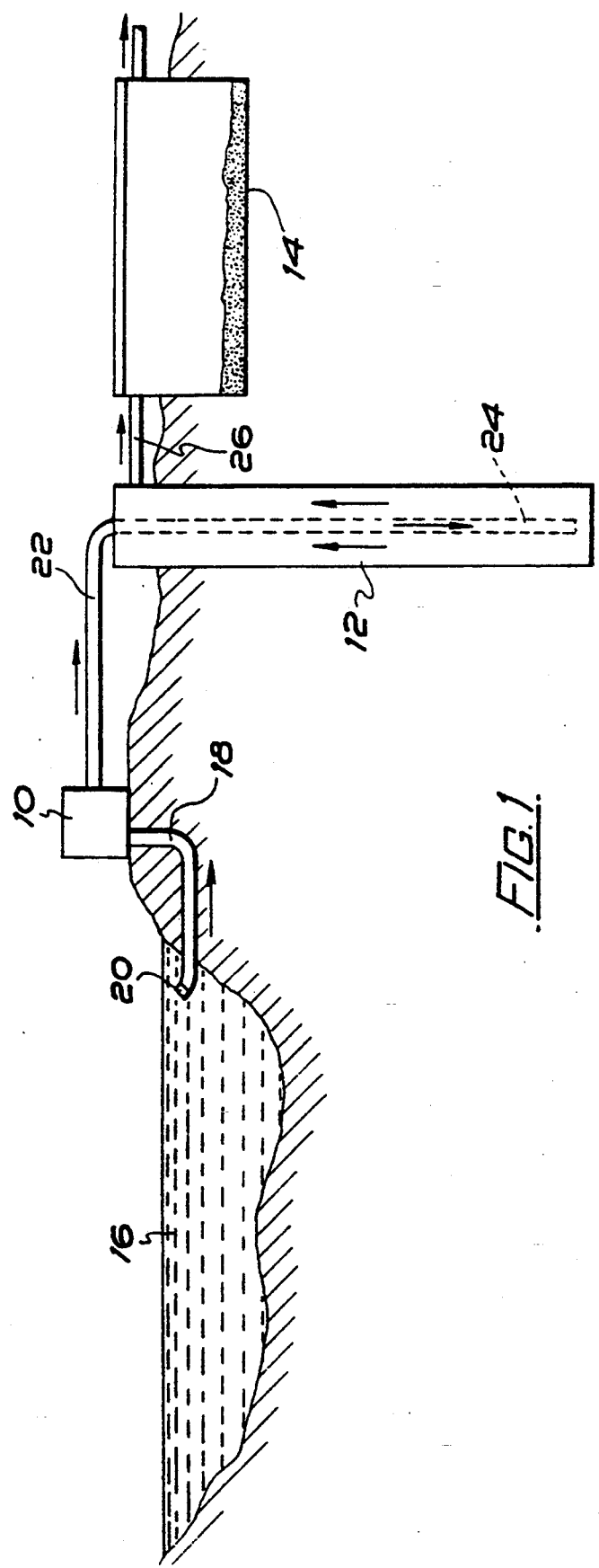
FIG. 1 is a diagrammatic representation of one preferred form of apparatus for the treatment of water to remove cyanobacteria.

Referring first to FIG. 1, the apparatus for the treatment of water to remove cyanobacteria comprises: a pump 10, a steel-lined bore hole 12 and a settling tank 14. Water from a lake or reservoir 16 is pumped by the pump 10 through a pipe 18 having an appropriate filter in its nozzle inlet section 20. The pumped water is passed to the bore-hole 12 via a pipe 22. As mentioned above the bore-hole 12 is lined with a steel lining to contain the water under pressure. A pipe 24 extends centrally down the bore-hole 12 to within a short distance from the bottom. Any other suitable lining material may be used instead of steel.

The preferred depth of the bore-hole 12 is about 60 m. However, the actual depth for any particular set of conditions is quite critical and has to be determined by experiment. Sufficient pressure must be generated, by the hydrostatic head at the bottom of pipe 24, to collapse enough gas vesicles to cause loss of the cyanobacteria's buoyancy. The minimum pressure required depends on the species of cyanobacterium present and may be from 3 bar to 10 bar. Since a pressure of 1 bar is generated by a vertical water column of 10.2 m the required depth of pipe 24 below the surface is, correspondingly, about 31 m to 102 m. According to the nature of the cyanobacteria and the location, the preferred depth may therefore lie in the range of from 31 m to 102 m.

The water from the reservoir 16 is thus pumped by the pump 10 down to the bottom of the pipe 24, where for a depth of 60 m the hydrostatic pressure of the water at the bottom of the bore-hole 12 is approximately 6 bar. The water which flows out of the top of the bore-hole 12 is passed to the settling tank 14 by means of a pipe 26.

Figure 2:
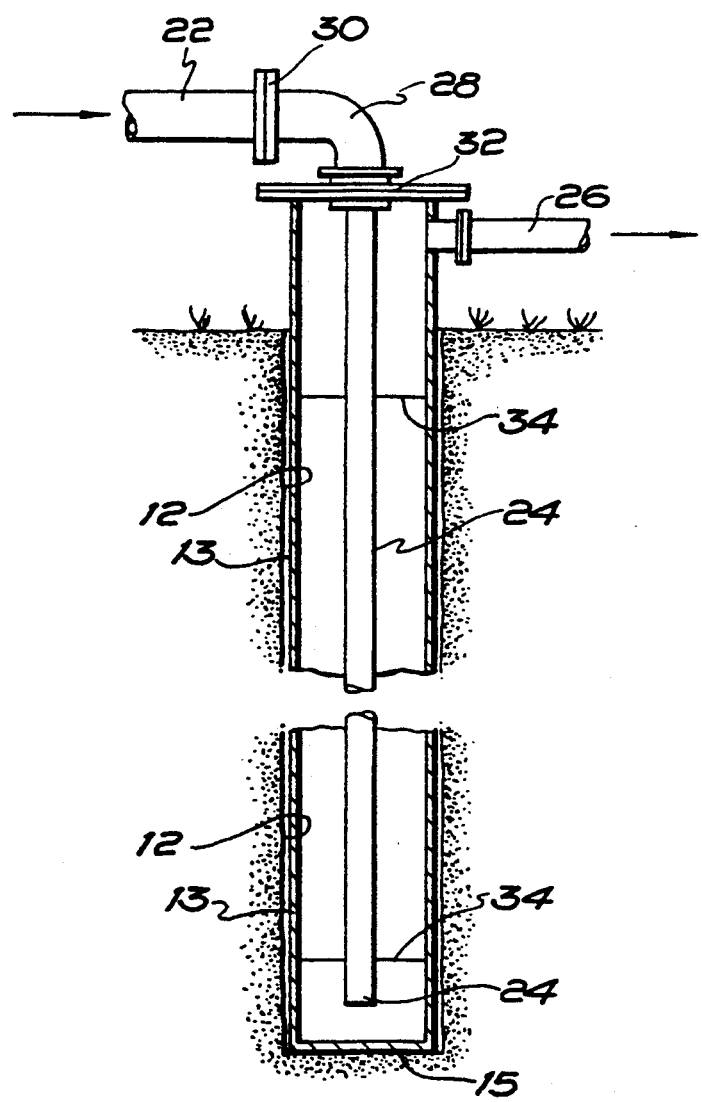
FIG. 2 is an elevation view of one preferred apparatus for hydrostatically subjecting the water to a predetermined pressure in order to collapse the gas vesicles in the cyanobacteria.

The construction of the bore-hole 12 is shown in greater detail in FIG. 2. After the bore-hole 12 has been dug in the ground it is sealed against penetration of liquid from the ground by being steel lined with a series of plates 13 or annular rings which are welded together. A circular steel plate 15 is provided at the bottom of the bore-hole 12. As shown, the pipe 22 from the pump 10 is connected to the centrally located vertical pipe 24 by means of an elbow joint 28 and flanges 30 and 32. The pipe 24 is centrally located within the steel-lined borehole by means of locating spiders 34 which are provided at equi-spaced intervals from top to bottom of the bore-hole 12.

In operation, water from the lake or reservoir 16 containing cyanobacteria is pumped to the bottom of the bore-hole 12 by means of the pipe 24, where the hydrostatic pessure builds up to about 6 bar. This pressure is sufficient to collapse the gas vesicles in the cyanobacteria, so that when they are carried out of the bore-hole 12 and into the settling tank 14 via the pipe 26, their specific gravity is now greater than unity so that they sink with the other sludge and foreign bodies to the bottom of the settling tank leaving clean treated water at the top of the settling tank from which it can be drawn for further treatment before being supplied to the customer.

A first alternative construction is shown in FIG. 3, wherein the height of the level of the lake or reservoir is above the location of the treatment apparatus and part of the hydrostatic head can be supplied by the difference in vertical level between the reservoir surface and the top of the bore-hole or between the top of a tower 44 and the top of a bore-hole 40. The required depth of the bore-hole 40 is reduced accordingly. As shown in FIG. 3, water from a reservoir 16 is pumped up to the top of a tower 44 by means of the pump 10 through a pipe 46. The bottom of the tower 44 is connected to the pipe 24 of the bore-hole 40 by a pipe Water is pumped into the top of the tower through the pipe 46 at a rate so as to maintain the level of water near the top of the tower 44. In this case the desired pressure of 6 bar can be produced by ensuring that the total head between the top of the tower 44 and the bottom of the pipe 24 is 60 m.

A second alternative construction is shown in FIG. 4 in which necessary to collapse the gas vesicles inside the cells of the cyanobacteria can be generated in a water container or pipe. As shown a pump 50 takes water from the reservoir 16 via the pipe 18 and supplies it to a horizontal cylindrical container or pipe 52 which is provided with a diffuser or pressure relief valve 54 at the other end. Water passing through the valve 54 is collected in the settling tank 14. The pressure which builds up in the container or pipe 52 is sufficient to collapse the gas vesicles inside the cells of the cyanobacteria which then sink to the bottom of the settling tank 14. Lastly a combination of the constructions shown in FIG. 3 and 4 is possible.

Whilst the above constructions have been described in connection with water treatment processes for public water supply customers, it will be appreciated that the same method and apparatus could be used to decrease the amount of cyanobacteria that contain gas vesicles in natural lakes or other water impoundments, and thereby to improve the water quality. In this case the pressure-treated water is returned to the lake either directly from the bore-hole, in which case the cyanobacteria will settle out on the lake bottom, or after removing the cyanobacteria by sedimentation in a settling tank. The preferred method would be to withdraw water from a particular depth at one end of the lake and to return it after treatment to the lake at another depth at a point remote from the withdrawal site, so as to minimize mixing of the treated and untreated water. Regard would be paid to the patterns of water circulation in the lake so that withdrawal occurred at a site, such as at lee shores, where the cyanobacteria tended to accumulate.

What we claim is:

1. An apparatus, comprising:
   a tank;
   water in said tank, said water containing gas vacuolate cyanobacteria;
   pressurizing means for subjecting the water in said tank to a predetermined pressure sufficient to collapse gas vesicles inside cells of the gas vacuolate cyanobacteria;
   settlement means communicating with said pressurizing means for holding the previously pressurized water and allowing the thus treated cyanobacteria to sink to the bottom of said settlement means;
   withdrawal means communicating with said settlement means for withdrawing water from above said cyanobacteria;
   said pressurizing means being hydrostatic including pipe means passing through the water to the bottom of the tank and subjecting the water to a pressure determined by the height of the water in the tank.

2. Apparatus for the treatment of water to remove gas vacuolate cyanobacteria which contain gas residues and float on the surface of the water, said apparatus comprising:
   pump means for extracting the water to be treated from a reservoir;
   a steel lined bore-hole sunk into the ground;
   a centrally located vertical pipe contained within said bore-hole, the lower end of which is open and located a short distance above the bottom of the bore-hole;
   first pipe means for connecting the top of said centrally located pipe to the outlet of said pump means, said bore-hole having a depth such that the natural hydrostatic head of water contained within said centrally located pipe provides a predetermined pressure which is sufficient to collapse the gas vesicles inside the cells of the cyanobacteria contained in said water; wherein substantially total pressure applied to collapse the gas vacuolate cyanobacteria comes from the bore-hole and the natural hydrostatic head of water contained within said centrally located pipe,
   a settling tank located adjacent said bore-hole;
   and second pipe means connecting the top of the bore-hole with the settling tank to convey water which has passed down the centrally located pipe to the settling tank so that the collapsed gas vacuolate cyanobacteria contained in said water conveyed to the settling tank settle at the bottom of the settling tank by sedimentation and an output of water from the settling tank is free of gas vacuolate cyanobacteria.

3. Apparatus according to claim 2, wherein the depth of the bore-hole lies in the range of 31 m to 102 m.

4. Apparatus according to claim 2, wherein said pressure at the bottom of the bore-hole provided by the hydrostatic head of water is in the range of 3 to 10 bar.

5. Apparatus according to claim 2, wherein said pressure at the bottom of the bore-hole provided by the hydrostatic head of water is approximately 6 bar.

6. Apparatus for treatment of water to remove gas vacuolate cyanobacteria which contains gas vesicles and float on the surface of the water, said apparatus comprising:
   pump means for extracting the water to be treated from a reservoir;
   a tower having inlet means at the top connected to the outlet of the pump means and outlet means at the bottom;
   a steel lined bore-hole sunk in the ground;
   a pipe extending vertically down the central zone of said bore-hole;
   a pipe means connecting the outlet means of the tower to the top of the pipe extending down the bore-hole;
   outlet means at the top of the bore-hole;
   and a settling tank connected to receive water from the outlet means of the bore-hole; the combined height of the tower and depth of the bore-hole being such that the natural hydrostatic head of water provided by said tower and bole-hole provides a predetermined pressure which is sufficient to collapse the gas vesicles inside the cells of the cyanobacteria contained in said water, wherein substantially the total pressure applied to collapse the gas vacuolate cyanobacteria comes from the bore-hole and the natural hydrostatic head of water contained within said centrally located pipe; whereby so that the collapsed gas vacuolate cyanobacteria contained in the water conveyed to the settling tank settle at the bottom of the settling tank by sedimentation, thus providing an output of water from the settling tank is free of gas vacuolate cyanobacteria.

7. An apparatus as in claim 6, wherein said head forming means includes a cylinder having vertical walls.

8. An apparatus as in claim 6, wherein said head forming means includes a bore-hole sunk into the ground and having a steel lining.

9. An apparatus as in claim 8, wherein the depth of the bore-hole is in the range of 31 meters to 102 meters.

10. An apparatus as in claim 6, wherein said hydrostatic head produces a pressure 3 to 10 bar.

11. Apparatus according to claim 6, wherein said hydrostatic head provided by the combined height of the tower and depth of the bore-hold is 60 m to provide a pressure of 6 bar.

* * * * *